(12) United States Patent
Loui et al.

(10) Patent No.: US 7,296,231 B2
(45) Date of Patent: Nov. 13, 2007

(54) VIDEO STRUCTURING BY PROBABILISTIC MERGING OF VIDEO SEGMENTS

(75) Inventors: Alexander C. Loui, Penfield, NY (US); Daniel Gatica-Perez, Seattle, WA (US)

(73) Assignee: Eastman Kodak Company, Rochester, NY (US)

( * ) Notice: Subject to any disclaimer, the term of this patent is extended or adjusted under 35 U.S.C. 154(b) by 679 days.

(21) Appl. No.: 09/927,041

(22) Filed: Aug. 9, 2001

(65) Prior Publication Data

US 2003/0058268 A1 Mar. 27, 2003

(51) Int. Cl.
*G06F 3/00* (2006.01)
(52) U.S. Cl. .................. 715/723; 348/584; 348/598; 382/236; 382/272; 382/284
(58) Field of Classification Search ............... 345/726, 345/723, 719, 328; 382/173, 236, 272, 226, 382/228, 284; 715/723; 348/584, 598
See application file for complete search history.

(56) References Cited

U.S. PATENT DOCUMENTS

| | | | |
|---|---|---|---|
| 5,664,227 A | 9/1997 | Mauldin et al. | 395/778 |
| 5,805,733 A | 9/1998 | Wang et al. | 382/232 |
| 5,821,945 A | 10/1998 | Yeo et al. | 345/440 |
| 5,828,809 A | 10/1998 | Chang et al. | 386/69 |
| 5,956,026 A * | 9/1999 | Ratakonda | 715/723 |
| 5,963,653 A * | 10/1999 | McNary et al. | 382/103 |
| 5,969,755 A * | 10/1999 | Courtney | 348/143 |
| 5,995,095 A | 11/1999 | Ratakonda | 345/328 |
| 6,008,847 A * | 12/1999 | Bauchspies | 375/240.1 |
| 6,249,285 B1 * | 6/2001 | Madden et al. | 345/419 |
| 6,263,103 B1 * | 7/2001 | Freeman et al. | 382/173 |
| 6,373,979 B1 * | 4/2002 | Wang | 382/165 |
| 6,489,989 B1 * | 12/2002 | Shapiro et al. | 348/180 |
| 6,535,639 B1 * | 3/2003 | Uchihachi et al. | 382/225 |
| 6,616,529 B1 * | 9/2003 | Qian et al. | 463/1 |

(Continued)

FOREIGN PATENT DOCUMENTS

EP 1 067 800 A1 1/2001

(Continued)

OTHER PUBLICATIONS

"Image Analysis and Mathematical Morphology", Serra, Jean, vol. 1, Academic Press, 1982.*

(Continued)

*Primary Examiner*—Weilun Lo
*Assistant Examiner*—Sara Hanne
(74) *Attorney, Agent, or Firm*—Robert L. Walker

(57) ABSTRACT

A method for structuring video by probabilistic merging of video segments includes the steps of obtaining a plurality of frames of unstructured video; generating video segments from the unstructured video by detecting shot boundaries based on color dissimilarity between consecutive frames; extracting a feature set by processing pairs of segments for visual dissimilarity and their temporal relationship, thereby generating an inter-segment visual dissimilarity feature and an inter-segment temporal relationship feature; and merging video segments with a merging criterion that applies a probabilistic analysis to the feature set, thereby generating a merging sequence representing the video structure. The probabilistic analysis follows a Bayesian formulation and the merging sequence is represented in a hierarchical tree structure.

25 Claims, 5 Drawing Sheets

U.S. PATENT DOCUMENTS

| | | | |
|---|---|---|---|
| 6,642,940 B1* | 11/2003 | Dakss et al. | 715/723 |
| 6,721,454 B1* | 4/2004 | Qian et al. | 382/224 |
| 2002/0157116 A1* | 10/2002 | Jasinschi | 725/136 |

FOREIGN PATENT DOCUMENTS

| | | |
|---|---|---|
| WO | WO 98/21688 | 5/1998 |

OTHER PUBLICATIONS

"AutoAlbum: Clustering Digital Photographs using Probabilistic Model Merging", Platt, John, Microsoft, (c) 2000, IEEE.*

"Video Object Model and Segmentation for Content-Based Video Indexing", Zhong, D. and Chang, S.-F. Jun. 1997, IEEE Intern. Conf. on Circuits and Systems.*

"Bayesian Modeling of Video Edting and Structure: Semantic Features for Video Summarization and Browising", Vasoncelos, Nuno and Lippman, Andrew. 1998, CiteSeer.IST Home.*

"Abstracting Home Video Automatically" by Rainer Lienhart. ACM Multimedia Conference, Orlando, Oct. 1999, pp. 37-41.

"Content-Based Browsing and Editing of Unstructured Video" by Giridharan Iyengar and Andrew B. Lippman. IEEE ICME, New York City, Aug. 2000.

"Maximum Likelihood from Incomplete Data via the EM Algorithm" by A.P. Dempster, N. M. Laird and D.B. Rubin. Journal of the Royal Statistical Society, Series B, 39:1-38, 1977.

"A Unified Framework for Video Browsing and Retrieval" by Y. Rui and T.S. Huang in A.C. Bovic, Ed., *Handbook of Image and Video Processing*, Academic Press, 1999.

"Extensive Operators in Partition Lattices for Image Sequence Analysis" by L. Garrido, P. Salembier, D. Garcia. Sign. Proc., 66(2): 157-180, 1998.

"The Theory and Practice of Bayesian Image Labeling", by C. Chou and C. Brown, IJCV, 1, pp. 185-210, 1990.

"Binary Partition Tree as an Efficient Representation for Filtering, Segmentation, and Information Retrieval" by P. Salembier and L. Garrido, IEEE Intl. Conference on Image Processing, ICIP 098, Chicago, Illinois, Oct. 4-7, 1998.

"Modeling by Shortest Data Description" by J. Rissanen, *Automatica*, 14: 465-471, 1978.

"Binary Partition Tree as an Efficient Representation for Filtering, Segmentation, and Information Retrieval" by P. Salembier and L. Garrido. IEEE Intl. Conference on Image Processing, ICIP '98, Chicago, Illinois, Oct. 4-7, 1998.

"Performance Characterizaiton of Video-Shot-Change Detection Methods" by Ullas Gargi, Rangachar Kasturi, and Susan H. Strayer, IEEE CSVT, vol. 10, No. 1, Feb. 2000, pp. 1-13.

"A Bayesian Video Modeling Framework for Shot Segmentation and Content Characterization" by Nuno Vasconcelos and Andrew Lippman. Proc. CVPR, 1997, pp. 59-66.

* cited by examiner

VIDEO STRUCTURING BY PROBABILISTIC MERGING OF VIDEO SEGMENTS

FIELD OF THE INVENTION

The invention relates generally to the processing and browsing of video material, and in particular to accessing, organizing and manipulating information from home videos.

BACKGROUND OF THE INVENTION

Among all the sources of video content, unstructured consumer video probably constitutes the content that most people are or would eventually be interested in dealing with. Organizing and editing personal memories by accessing and manipulating home videos represents a natural technological extension to the traditional still picture organization. However, although attractive with the advent of digital video, such efforts remain limited by the size of these visual archives, and by the lack of efficient tools for accessing, organizing, and manipulating home video information. The creation of such tools would also open doors to the organization of video events in albums, video baby books, editions of postcards with stills extracted from video data, multimedia family web-pages, etc. In fact, the variety of user interests suggests an interactive solution, which requires a minimum amount of user feedback to specify the desired tasks at the semantic level, and which provides automated algorithms for those tasks that are tedious or can be performed reliably.

In commercial video, many moving image documents have story structures which are reflected in the visual content. In such situations, a complete moving image document is referred to as a video clip. The fundamental unit of the production of video is the shot, which captures continuous action. The identification of video shots is achieved by scene change detection schemes which give the start and end of each shot. A scene is usually composed of a small number of interrelated shots that are unified by location or dramatic incident. Feature films are typically composed of a number of scenes, which define a storyline for understanding the content of the moving image document.

In contrast with commercial video, unrestricted content and the absence of storyline are the main characteristics of home video. Consumer contents are usually composed of a set of events, either isolated or related, each composed of one or a few shots, randomly spread along time. Such characteristics make consumer video unsuitable for video analysis approaches based on storyline models. However, there still exists a spatio-temporal structure, based on visual similarity and temporal adjacency between video segments (sets of shots) that appears evident after a statistical analysis of a large home video database. Such structure, essentially equivalent to the structure of consumer still images, points towards addressing home video structuring as a problem of clustering. The task at hand could be defined as the determination of the number of clusters present in a given video clip, and the design of an optimality criterion for assigning cluster labels to each frame/shot in the video sequence. This has indeed been the direction taken by most research in video analysis, even when dealing with storylined content.

For example, in U.S. Pat. No. 5,821,945, a technique is described for extracting a hierarchical decomposition of a complex video selection for browsing purposes, and combining visual and temporal information to capture the important relations within a scene and between scenes in a video. Thus, it is said, this allows the analysis of the underlying story structure with no a priori knowledge of the content. Such approaches perform video structuring in variations of a two-stage methodology: video shot boundary detection (shot segmentation), and shot clustering. The first stage is by far the most studied in video analysis (see, e.g., U. Gargi, R. Kasturi and S. H. Strayer, "Performance Characterization of Video-Shot-Change Detection Methods", *IEEE CSVT*, Vol. 10, No. 1, February 2000, pp. 1-13). For the second stage, using shots as the fundamental unit of video structure, K-means, distribution-based clustering, and time-constrained merging techniques have all been disclosed in the prior art. Some of these methods usually require setting of a number of parameters, which are either application-dependent or empirically determined by user feedback.

As understood in the prior art, hierarchical representations seem to be not only natural to represent unstructured content, but are probably the best way of providing useful non-linear interaction models for browsing and manipulation. Fortunately, as a byproduct, clustering allows for the generation of hierarchical representations for video content. Different models for hierarchical organization have also been proposed in the prior art, including scene transition graphs (e.g., see the aforementioned U.S. Pat. No. 5,821, 945), and tables of contents based on trees, although the efficiency/usability of each specific model remains in general as an open issue.

To date, only a few works have dealt with analysis of home video (e.g., see G. Iyengar and A. Lippman, "Content-based Browsing and Edition of Unstructured Video", *IEEE ICME*, New York City, August 2000; R. Lienhart, "Abstracting Home Video Automatically", *ACM Multimedia Conference*, Orlando, October, 1999, pp. 37-41; and Y. Rui and T. S. Huang, "A Unified Framework for Video Browsing and Retrieval", in A. C. Bovik, Ed., *Handbook of Image and Video Processing*, Academic Press, 1999). The work in the Lienhart article uses time-stamp information to perform clustering for generation of video summaries. Time-stamp information, however, might not always be available. Even though digital cameras include this information, users do not always use the time option. Therefore, a general solution cannot rely on this information. The work in the Rui and Huang article for generation of tables-of-contents, based on very simple statistical assumptions, was tested on some home videos with "storyline". However, the highly unstructured nature of home video makes the application of specific storyline models quite limited. With the exception of the Iyengar and Lippman article, none of the previous approaches have analyzed in detail the inherent statistics of such content. From this point of view, the present invention is more related to the work in N. Vasconcelos and A. Lippmann, "A Bayesian Video Modeling Framework for Shot Segmentation and Content Characterization", *Proc. CVPR*, 1997, that proposes a Bayesian formulation for shot boundary detection based on statistical models of shot duration, and to the work in the Iyengar and Lippmann article that addresses home video analysis using a different probabilistic formulation.

Nonetheless, it is unclear from the prior art that a probabilistic methodology that uses video shots as the unit of organization could support the creation of a video hierarchy for interaction. In arriving at the present invention, statistical models of visual and temporal features in consumer video have been investigated for organization purposes. In particular, a Bayesian formulation seemed appealing to encode prior knowledge of the spatio-temporal structure of home video. In a departure from the prior art, the inventive approach described herein is based on an efficient probabilistic video segment merging algorithm which integrates inter-segment features of visual similarity, temporal adjacency, and duration in a joint model that allows for the generation of video clusters without empirical parameter determination.

SUMMARY OF THE INVENTION

The present invention is directed to overcoming one or more of the problems set forth above. Briefly summarized, according to one aspect of the present invention, a method for structuring video by probabilistic merging of video segments includes the steps of a) obtaining a plurality of frames of unstructured video; b) generating video segments from the unstructured video by detecting shot boundaries based on color dissimilarity between consecutive frames; c) extracting a feature set by processing pairs of segments for visual dissimilarity and their temporal relationship, thereby generating an inter-segment visual dissimilarity feature and an inter-segment temporal relationship feature; and d) merging video segments with a merging criterion that applies a probabilistic analysis to the feature set, thereby generating a merging sequence representing the video structure. In the preferred embodiment, the probabilistic analysis follows a Bayesian formulation and the merging sequence is represented in a hierarchical tree structure that includes a frame extracted from each segment.

As described above, this invention employs methods for consumer video structuring based on probabilistic models. More specifically, the invention proposes a novel methodology to discover cluster structure in home videos, using video shots as the unit of organization. The methodology is based on two concepts: (i) the development of statistical models (e.g., learned joint mixture Gaussian models) to represent the distribution of inter-segment visual similarity and an inter-segment temporal relationship, including temporal adjacency and duration of home video segments, and (ii) the reformulation of hierarchical clustering (merging) as a sequential binary classification process. The models are used in (ii) in a probabilistic clustering algorithm, for which a Bayesian formulation is useful since these models can incorporate prior knowledge of the statistical structure of home video, and which offers the advantages of a principled methodology. Such prior knowledge can be extracted from the detailed analysis of the cluster structure of a real home video database.

The video structuring algorithm can be efficiently implemented according to the invention and does not need any ad-hoc parameter determination. As a byproduct, finding video clusters allows for the generation of hierarchical representations for video content, which provide nonlinear access for browsing and manipulation.

A principal advantage of the invention is that, based on the performance of the methodology with respect to cluster detection and individual shot-cluster labeling, it is able to deal with unstructured video and video with unrestricted content, as would be found in consumer home video. Thus, it is the first step for building tools for a system for the interactive organization and retrieval of home video information.

As a methodology for consumer video structuring based on a Bayesian video segment merging algorithm, another advantage is that the method automatically governs the merging process, without empirical parameter determination, and integrates visual and temporal segment dissimilarity features in a single model.

Furthermore, the representation of the merging sequence by a tree provides the basis for a user-interface that allows for hierarchical, non-linear access to the video content.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because video processing systems employing shot detection and cluster analysis are well known, the present description will be directed in particular to attributes forming part of, or cooperating more directly with, a video structuring technique in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Accessing, organizing and manipulating personal memories stored in home videos constitutes a technical challenge, due to its unrestricted content, and the lack of clear storyline structure. In this invention, a methodology is provided for structuring of consumer video, based on the development of parametric statistical models of similarity and adjacency between shots, the unit of visual information in consumer video clips. A Bayesian formulation for merging of shots appears as a reasonable choice as these models can encode prior knowledge of the statistical structure of home video. Therefore, the methodology is based on shot boundary detection and Bayesian segment merging. Gaussian Mixture joint models of inter-segment visual similarity, temporal adjacency and segment duration—learned from home video training samples using the Expectation-Maximization (EM) algorithm—are used to represent the class-conditional densities of the observed features. Such models are then used in a merging algorithm consisting of a binary Bayes classifier, where the merging order is determined by a variation of Highest Confidence First (HCF), and the Maximum a Posteriori (MAP) criterion defines the merging criterion. The merging algorithm can be efficiently implemented by the use of a hierarchical queue, and does not need any empirical parameter determination. Finally, the representation of the merging sequence by a tree provides the basis for a user-interface that allows for hierarchical, non-linear access to the video content.

Figure 1:
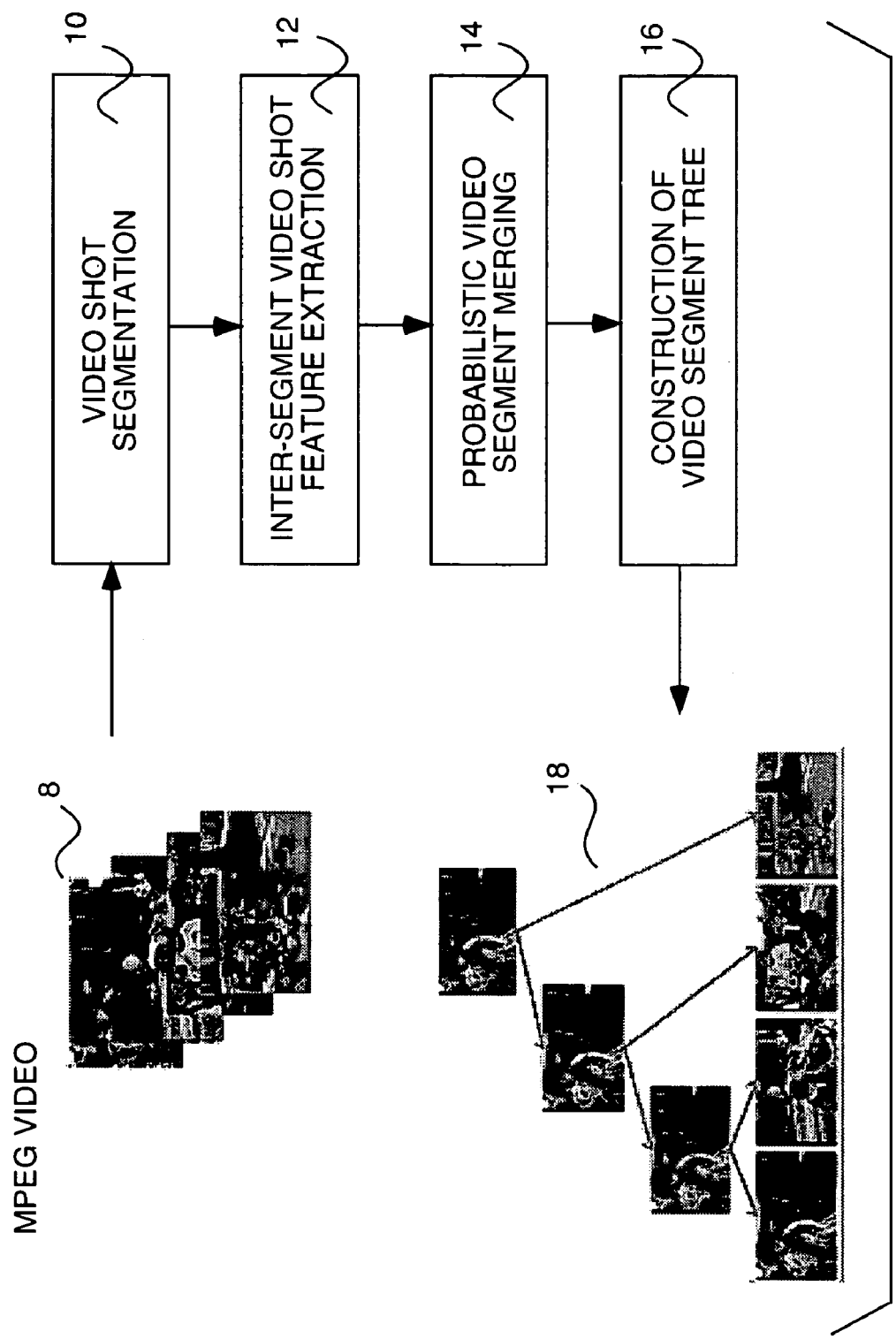
FIG. 1 is a block diagram providing a functional overview of video structuring according to the present invention.

Referring first to FIG. 1, the video structuring method is shown to operate on a sequence of video frames stage 8 obtained from an unstructured video source, typically displaying an unrestricted content, such as found in consumer home videos. The salient features of the video structuring method according to the invention can be concisely summarized in the following four stages (which will be subsequently described in later sections in more detail):

1) The Video Segmentation Stage 10: Shot detection is computed by adaptive thresholding of a histogram difference signal. 1-D color histograms are computed in RGB space, with N=64 quantization levels for each band. The L1 metric is used to represent the dissimilarity $d_C(t,t+1)$ between two consecutive frames. As a post-processing step, an in-place morphological hit-or-miss transform is applied to the binary signal with a pair of structuring elements that eliminate the presence of multiple adjacent shot boundaries.

2) The Video Shot Feature Extraction Stage 12: It is known in the art that visual similarity is not enough to differentiate between two different video events (e.g., see the Rui and Huang article). Both visual similarity and temporal information have been used for shot clustering in the prior art. (However, the statistical properties of such variables have not been studied under a Bayesian perspective.) In this invention, three main features in a video sequence are utilized as criteria for subsequent merging:

Visual similarity is described by the mean segment histogram that represents segment appearance. The mean histogram represents both the presence of the dominant colors and their persistence within the segment.

Temporal separation between segments is a strong indication of their belonging to the same cluster.

Combined temporal duration of two individual segments is also a strong indicator about their belonging to the same cluster (e.g., two long shots are not likely to belong to the same video cluster).

3) The Video Segment Merging Stage 14: This step is carried out by formulating a two-class (merge/not merge) pattern classifier based on Bayesian decision theory. Gaussian Mixture joint models of inter-segment visual similarity, temporal adjacency and segment duration—learned from home video training samples using the Expectation-Maximization (EM) algorithm—are used to represent the class-conditional densities of the observed features. Such models are then used in a merging algorithm comprising a binary Bayes classifier, where the merging order is determined by a variation of Highest Confidence First (HCF), and the Maximum a Posteriori (MAP) criterion defines the merging criterion. The merging algorithm can be efficiently implemented by the use of a hierarchical queue, and does not need any empirical parameter determination. A flow graph of the merging procedure is given in FIG. 2 and will be described in further detail later in this description.

Figure 5:
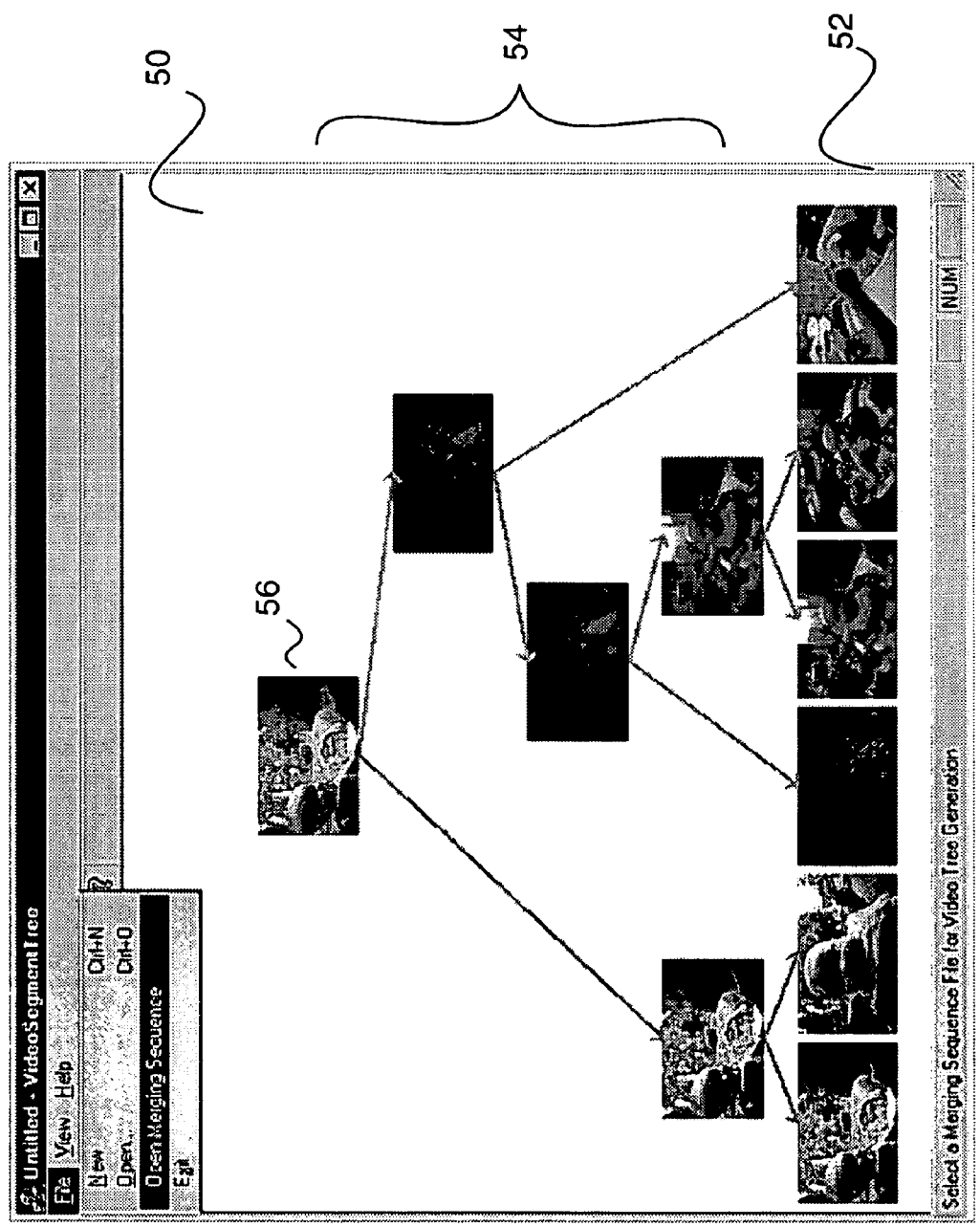
FIG. 5 is a tree representation of key frames from a typical home video.

4) The Video Segment Tree Construction Stage 16: The merging sequence, i.e. a list with the successive merging of pairs of video segments, is stored and used to generate a hierarchy, whose merging sequence is represented by a binary partition tree 18. FIG. 5 shows a tree representation from a typical home video.

1. An Overview of the Approach

Assume a feature vector representation for video segments, i.e., suppose that a video clip has been divided into shots or segments (where a segment is composed of one or more shots), and that features that represent them have been extracted. Any clustering procedure should specify mechanisms both to assign cluster labels to each segment in the home video clip and to determine the number of clusters (where a cluster may encompass one or more segments). The clustering process needs to include time as a constraint, as video events are of limited duration (e.g., see the Rui and Huang article). However, the definition of a generic generative model for intra-segment features in home videos is particularly difficult, given their unconstrained content. Instead, according to the present invention, home video is analyzed using statistical inter-segment models. In other words, the invention proposes to build up models that describe the properties of visual and temporal features defined on pairs of segments. Inter-segment features naturally emerge in a merging framework, and integrate visual dissimilarity, duration, and temporal adjacency. A merging algorithm can be thought of as a classifier, which sequentially takes a pair of video segments and decides whether they should be merged or not. Let $s_i$ and $s_j$ denote the i-th and j-th video segments in a video clip, and let $\epsilon$ be a binary random variable (r.v.) that indicates whether such pair of segments correspond to the same cluster and should be merged or not. The formulation of the merging process as a sequential two-class (merge/not merge) pattern classification problem allows for the application of concepts from Bayesian decision theory (for a discussion of Bayesian decision theory, see, e.g., R. O. Duda, P. E. Hart and D. G. Stork, *Pattern Classification*, $2^{nd}$ ed., John Wiley and Sons, 2000). The Maximum a Posteriori (MAP) criterion establishes that given an n-dimensional realization $x_v$ of an r.v. x (representing inter-segment features and detailed later in the specification), the class that must be selected is the one that maximizes the a posteriori probability mass function of $\epsilon$ given x, i.e., $$\varepsilon^* = \arg\max_{\varepsilon} Pr(\varepsilon \mid x)$$

By Bayes rule, $$Pr(\varepsilon \mid x) = \frac{p(x \mid \varepsilon) Pr(\varepsilon)}{p(x)}$$

where $p(x|\epsilon)$ is the likelihood of x given $\epsilon$, and $Pr(\epsilon)$ is the prior of $\epsilon$, and $p(x)$ is the distribution of the features. The application of the MAP principle can then be expressed $$\varepsilon^* = \begin{cases} 1, & p(x \mid \varepsilon = 1) Pr(\varepsilon = 1) > p(x \mid \varepsilon = 0) Pr(\varepsilon = 0) \\ 0 & \text{otherwise} \end{cases}$$

or in standard hypothesis testing notation, the MAP principle can be expressed as $$p(x|\varepsilon=1)Pr(\varepsilon=1) \underset{H_0}{\overset{H_1}{\underset{<}{>}}} p(x|\varepsilon=0)Pr(\varepsilon=0)$$

where $H_1$ denotes the hypothesis that the pair of segments should be merged, and $H_0$ denotes the opposite. With this formulation, the classification of pairs of shots is performed sequentially, until a certain stop criteria is satisfied. Therefore, the tasks are the determination of a useful feature space, the selection of models for the distributions, and the specification of the merging algorithm. Each of these steps are described in the following sections of the description.

2. Video Segmentation

To generate the basic segments, shot boundary detection is computed in stage 10 by a series of methods to detect the cuts usually found in home video (see, e.g., U. Gargi, R. Kasturi and S. H. Strayer, "Performance Characterization of Video-Shot-Change Detection Methods", *IEEE CSVT*, Vol. 10, No. 1, February 2000, pp. 1-13). Over-segmentation due to detection errors (e.g. due to illumination or noise artifacts) can be handled by the clustering algorithm. Additionally, videos of very poor quality are removed.

In implementing a preferred embodiment of the invention, shot detection is determined by adaptive thresholding of a histogram difference signal. 1-D color histograms are computed in the RGB space, with N=64 quantization levels for each band. Other color models (LAB or LUV) could be used, and might provide better shot detection performance, but at increased computational cost. The L1 metric is used to represent the color dissimilarity $d_C(t,t+1)$ between two consecutive frames:

$$d_C(t, t+1) = \sum_{k=1}^{3N} |h_t^k - h_{t+1}^k|$$

where $h_t^k$ denotes the value of the k-th bin for the concatenated RGB histogram of frame t. The 1-D signal $d_C$ is then binarized by a threshold that is computed on a sliding window centered at time t of length fr/2, where fr denotes the frame rate.

$$s(t) = \begin{cases} 1 & d_C(t) > \mu_d(t) + k\sigma_d(t) \\ 0 & \text{otherwise} \end{cases}$$

where $\mu_d(t)$ denotes the mean of dissimilarities computed on the sliding window, $\sigma_d(t)$ denotes the mean absolute deviation of the dissimilarity within the window, which is known to be a more robust estimator of the variability of a data set around its mean, and k is a factor that sets the confidence interval for determination of the threshold, set in the interval. Consecutive frames are therefore deemed to belong to the same shot if s(t)=0, and a shot boundary between adjacent frames is identified when s(t)=1.

As a post-processing step, an in-place morphological hit-or-miss transform is applied on the binary signal with a pair of structuring elements that eliminate the presence of multiple adjacent shot boundaries, $$b(t)=s(t)(e_1(t),e_2(t))$$

where denotes hit-or-miss, and the size of the structuring elements is based on the home video shot duration histograms (home video shots are unlikely to last less than a few seconds), and it is set to fr/2 (see Jean Serra: *Image Analysis and Mathematical Morphology*, Vol. 1, Academic Press, 1982).

3. Video Inter-Segment Feature Definition

A feature set for visual dissimilarity, temporal separation and accumulated segment duration is generated in the video shot feature extraction stage 12. Both visual dissimilarity and temporal information, particularly temporal separation, have been used for clustering in the past. In the case of visual dissimilarity, and in terms of discerning power of a visual feature, it is clear that a single frame is often insufficient to represent the content of a segment. From the several available solutions, the mean segment color histogram is selected to represent segment appearance, $$m_i = \frac{1}{M_i} \sum_{t=b_i}^{e_i} h_t$$

where $h_t$ denotes the t-th color histogram, and $m_i$ denotes the mean histogram of segment $s_i$, each consisting of $M_i=e_i-b_i+1$ frames ($b_i$ and $e_i$ denote the beginning and ending frame of segment $s_i$). The mean histogram represents both the presence of the dominant colors and their persistence within the segment. The L1 norm of the mean segment histogram difference is used to visually compare a pair of segments i and j, $$\alpha_{ij} = \sum_{k=1}^{B} |m_{ik} - m_{jk}|$$

where $\alpha_v$ denotes visual dissimilarity between segments i and j, B is the number of histogram bins, $m_{ik}$ is the value of the k-th bin of the mean color histogram of segment $s_i$, and $m_{jk}$ is the value of the k-th bin of the mean color histogram of segment $s_j$.

In the case of temporal information, the temporal separation between segments $s_i$ and $s_j$, which is a strong indication of their belonging to the same cluster, is defined as $$\beta_v = \min(|e_i-b_j|,|e_j-b_i|)(1-\delta_v)$$

where $\delta_v$ denotes a Kronecker's delta, $b_i,e_i$ denote first and last frames of segment $s_i$, and $b_j,e_j$ denote first and last frames of segment $s_j$.

Figure 3:
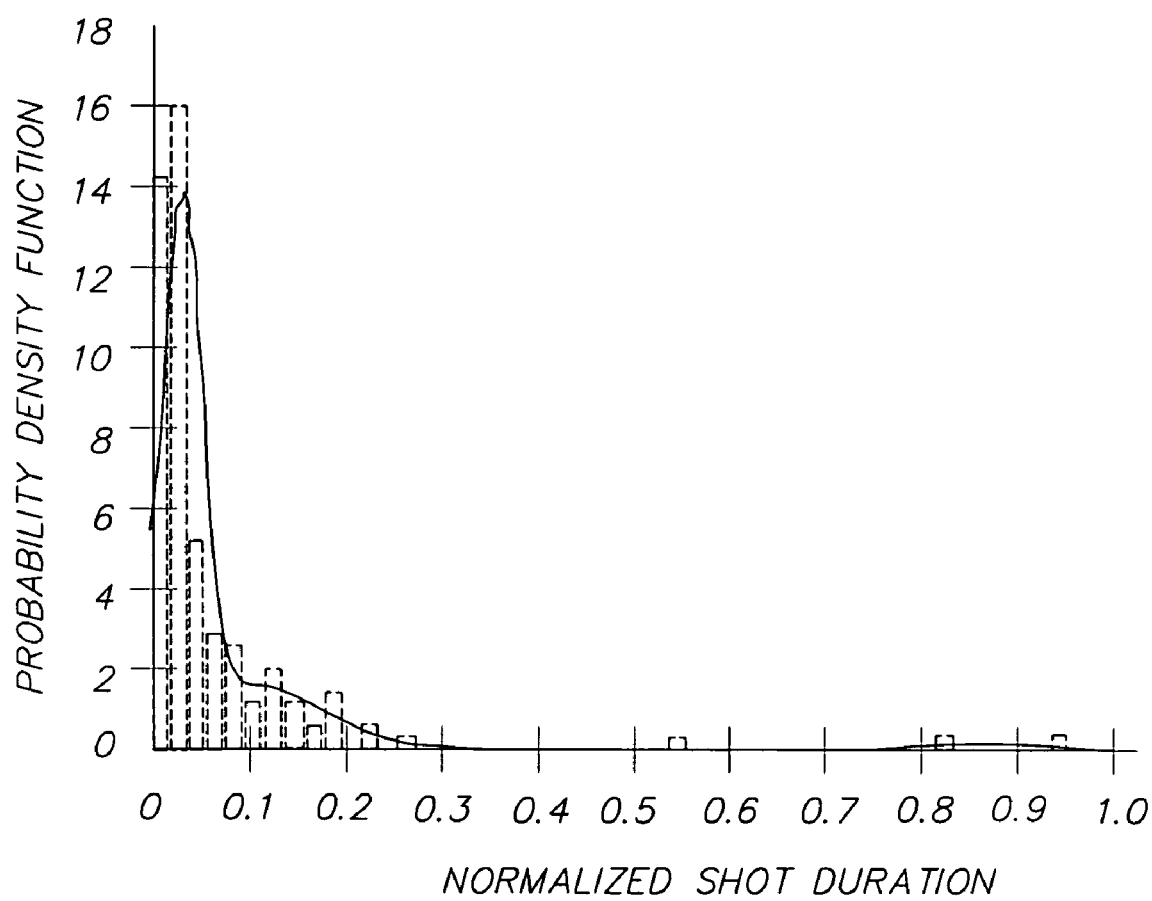
FIG. 3 is a distribution plot of consumer video shot duration for a group of consumer images.

Additionally, the accumulated segment (combined) duration of two individual segments is also a strong indication about their belonging to the same cluster. FIG. 3 shows the empirical distribution of home video shot duration for approximately 660 shots from a database with ground-truth, and its fitting by a Gaussian mixture model (see next subsection). (In FIG. 3, the empirical distribution, and an estimated Gaussian mixture model consisting of six components, are superimposed. Duration was normalized to the longest duration found in the database (580 sec.).) Even though videos correspond to different scenarios and were filmed by multiple people, a clear temporal pattern is present (see also the Vasconcelos and Lippmann article). The accumulated segment duration $\tau_v$ is defined as $$\tau_v = \text{card}(s_i) + \text{card}(s_j)$$

where card(s) denotes the number of frames in segment s.

4. Modeling of Likelihoods and Priors

Figure 4:
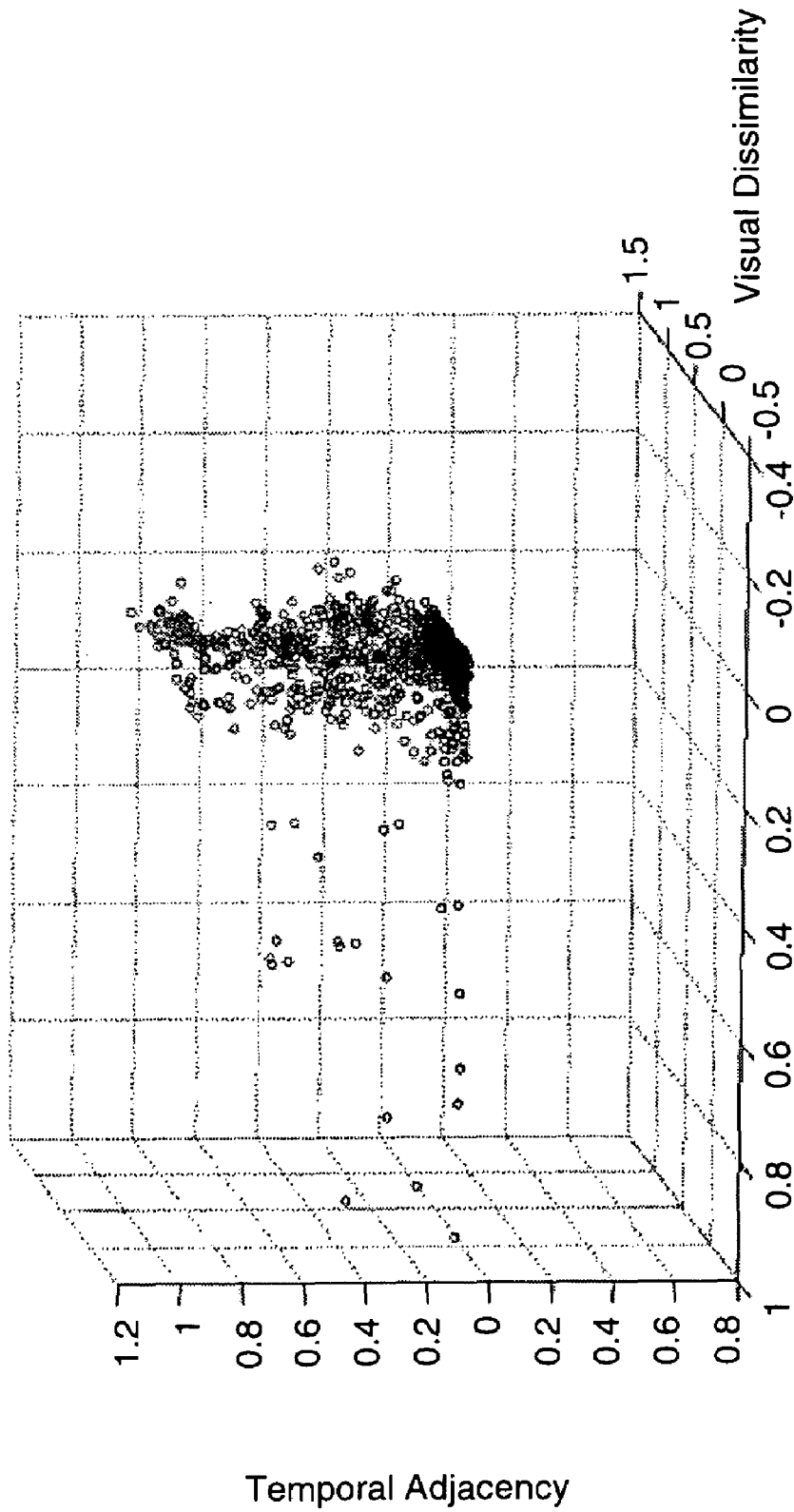
FIG. 4 is a scatter plot of labeled inter-segment feature vectors extracted from a home video.

The statistical modeling of the inter-segment feature set is generated in the video segment merging stage 14. The three described features become the components of the feature space X, with vectors $x=(\alpha, \beta, \tau)$. To analyze the separability of the two classes, FIG. 4 shows a scattering plot of 4000 labeled inter-segment feature vectors extracted from home video. (Half of the samples correspond to hypothesis $H_1$ (segment pair belongs together, labeled with light gray), and the other half to $H_0$ (segment pair does not belong together, labeled with dark gray). The features have been normalized.)

The plot indicates that the two classes are in general separated. A projection of this plot clearly illustrates the limits of relying on pure visual similarity. A parametric mixture model is adopted for each of the class-conditional densities of the observed inter-segment features, $$p(x \mid \varepsilon, \Theta) = \sum_{i=1}^{K_\varepsilon} Pr(c=i) p(x \mid \varepsilon, \theta_i)$$

where $K_\varepsilon$ is the number of components in each mixture, Pr(c=i) denotes the prior probability of the i-th component, $p(x|\varepsilon,\theta_i)$ is the i-th pdf parameterized by $\theta_i$, and $\Theta=\{Pr(c), \{\theta_i\}\}$ represents the set of all parameters. In this invention, we assume multivariate Gaussian forms for the components of the mixtures in d-dimensions $$p(x \mid \varepsilon, \theta_i) = \frac{1}{(2\pi)^{d/2}|\Sigma_i|^{1/2}} e^{-\frac{1}{2}(x-\mu_i)^T \Sigma_\varepsilon^{-1}(x-\mu_i)}$$

so that the parameters $\theta_i$ are the means $\mu_i$ and covariance matrices $\Sigma_i$ (see Duda et al., *Pattern Classification*, op. cit.).

The well-known expectation-maximization (EM) algorithm constitutes the standard procedure for Maximum Likelihood estimation (ML) of the set of parameters $\Theta$ (see A. P. Dempster, N. M. Laird and D. B. Rubin, "Maximum Liklihood from Incomplete Data via the EM Algorithm", *Journal of the Royal Statistical Society*, Series B, 39:1-38, 1977). EM is a known technique for finding ML estimates for a broad range of problems where the observed data is in some sense incomplete. In the case of a Gaussian Mixture, the incomplete data are the unobserved mixture components, whose prior probabilities are the parameters {Pr(c)}. EM is based on increasing the conditional expectation of the log-likelihood of the complete data given the observed data by using an iterative hill-climbing procedure. Additionally, model selection, i.e., the number of components of each mixture can be automatically estimated using the Minimum Description Length (MDL) principle (see J. Rissanen, "Modeling by Shortest Data Description", *Automatica*, 14:465-471, 1978).

The general EM algorithm, valid for any distribution, is based in increasing the conditional expectation of the log-likelihood of the complete data Y given the observed data $X=\{x_1, \ldots, x_N\}$:

$$Q(\theta|\theta^{(p)}) = E\{\log p(Y|\theta)|x, \theta^{(p)}\}$$

by using an iterative hill-climbing procedure. In the previous equation, X=h(Y) denotes a known many-to-one function (for example, a subset operator), x represents a sequence or vector of data, and p is an superscript that denotes the iteration number. The EM algorithm iterates the following two steps until convergence to maximize $Q(\theta)$:

E-step: Find the expected likelihood of the complete data as a function of $\theta$, $Q(\theta|\theta^{(p)})$.

M-step: Re-estimate parameters, according to $$\theta^{(p+1)} = \underset{\theta}{\arg\max} Q(\theta \mid \theta^{(p)})$$

In other words, firstly estimate values to fill in for the incomplete data in the E-Step (using the conditional expectation of the log-likelihood of the complete data given the observed data, instead of the log-likelihood itself). Then, compute the maximum likelihood parameter estimate using in the M-step, and repeat until a suitable stopping criterion is reached. EM is an iterative algorithm that converges to a local maximum of the likelihood of the sample set.

For the specific case of multivariate Gaussian models, the complete data is given by Y=(X,I), where I indicates the Gaussian component that has been used in generating each sample of the observed data. Element-wise, y=(x,i), i∈ $\{1, \ldots, K_\varepsilon\}$. In this case, EM takes a further simplified form:

E-step: For all N training samples, and for all mixture components, compute the probability that Gaussian i fits the sample $x_j$ given the current estimation $\Theta^{(p)}$, $$p(i \mid x_j, \varepsilon, \Theta^{(p)}) = \frac{\pi_i p(x_j \mid \varepsilon, \theta_i^{(p)})}{\sum_{k=1}^{K_\varepsilon} \pi_k p(x_j \mid \varepsilon, \theta_k^{(p)})}$$

M-step: Re-estimate parameters, $$\pi_i^{(p+1)} = \frac{1}{N} \sum_{j=1}^{N} p(i \mid x_j, \varepsilon, \Theta^{(p)})$$

$$\mu_i^{(p+1)} = \frac{\sum_{j=1}^{N} x_j p(i \mid x_j, \varepsilon, \Theta^{(p)})}{\sum_{j=1}^{N} p(i \mid x_j, \varepsilon, \Theta^{(p)})}$$

$$\Sigma_i^{(p+1)} = \frac{\sum_{j=1}^{N} p(i \mid x_j, \varepsilon, \Theta^{(p)})(x_j - \mu_i^{(p+1)})(x_j - \mu_i^{(p+1)})^T}{\sum_{j=1}^{N} p(i \mid x_j, \varepsilon, \Theta^{(p)})}$$

The mean vectors and covariance matrices for each of the mixture components must be initialized in the first place. In this implementation, the means are initialized using the traditional K-means algorithm, while the covariance matrices are initialized with the identity matrix. As other hill climbing methods, data-driven initialization usually performs better than pure random initialization. Additionally, on successive restarts of the EM iteration, a small amount of noise is added to each mean, to diminish the procedure to be trapped in local maxima.

The convergence criterion is defined by the rate of increase on the log-likelihood of the observed data in successive iterations, $$\log L(\Theta \mid X) = \log \prod_{j=1}^{N} p(x_j \mid \varepsilon, \Theta)$$

i.e., the EM iteration is terminated when $$\frac{\log L(\Theta^{(p+1)} \mid X) - \log L(\Theta^{(p)} \mid X)}{\log L(\Theta^{(p)} \mid X)} \leq 10^{-2}$$

The specific model, i.e., the number of components $K_\varepsilon$ of each mixture is automatically estimated using the Minimum Description Length (MDL) principle, by choosing $$K_\varepsilon^* = \underset{K_\varepsilon}{\mathrm{argmax}} \left( \log L(\Theta \mid X) - \frac{n_{K_\varepsilon}}{2} \log N \right)$$

where $L(\cdot)$ denotes the likelihood of the training set, and $n_{K_\varepsilon}$ is the number of parameters needed for the model, which for a Gaussian mixture is equal to $$n_{K_\varepsilon} = (K_\varepsilon - 1) + K_\varepsilon d + K_\varepsilon \frac{d(d+1)}{2}$$

When two models fit the sample data in a similar way, the simpler model (smaller $K_{68}$) is chosen.

Instead of imposing independence assumptions among the variables, the full joint class-conditional pdfs are estimated. The ML estimation of the parametric models for $p(x|\varepsilon=0)$ and $p(x|\varepsilon=1)$, by the procedure just described, produces probability densities represented by ten components in both cases, respectively.

In the Bayesian approach, the prior probability mass function $Pr(\varepsilon)$ encodes all the previous knowledge at hand about the specific problem. In this particular case, this represents the knowledge or belief about the merging process characteristics (home video clusters mostly consist of only a few shots). There exist a variety of solutions that can be explored:

The simplest assumption is $Pr(\varepsilon=0)=Pr(\varepsilon=1)=\frac{1}{2}$, which turns the MAP criterion into the ML criterion.

The priors themselves can be ML-estimated from training data (see Duda et al., *Pattern Classification*, op. cit.). It is straightforward to show that, assuming that the N are independent, the ML estimator of the priors is $$Pr(\varepsilon = e) = \frac{1}{N} \sum_{k=1}^{N} \tau(e, k)$$

where $\tau(e,k)$ is equal to one if the k-th training sample belongs to the class represented by $\varepsilon=e$, $e \in \{0,1\}$, and zero otherwise. In other words, the priors are simply weights determined by the available evidence (the training data).

The dynamics involved in the merging algorithm (presented in the following section) also influences the prior knowledge in a sequential manner (it is expected that more segments will be merged at the beginning of the process, and less at the end). In other words, the prior can be dynamically updated based on this rationale.

5. Video Segment Clustering

The merging algorithm is implemented in the video segment merging stage 14. Any merging algorithm requires three elements: a feature model, a merging order, and a merging criterion (L. Garrido, P. Salembier, D. Garcia, "Extensive Operators in Partition Lattices for Image Sequence Analysis", Sign. Proc., 66(2): 157-180, 1998). The merging order determines which clusters should be probed for possible merging at each step of the process. The merging criterion decides whether the merging should occur or not. The feature model of each cluster should be updated if a merging occurs. The present video segment clustering method uses this general formulation, based on the statistical inter-segment models developed in the previous section. In the present algorithm, the class-conditionals are used to define both the merging order and the merging criterion.

Merging algorithms can be efficiently implemented by the use of adjacency graphs and hierarchical queues, which allow for prioritized processing. Elements to be processed are assigned a priority, and introduced into the queue according to it. Then, the element that is extracted at each step is the one that has the highest priority. Hierarchical queues are now traditional tools in mathematical morphology. Their use in Bayesian image analysis first appeared in C. Chou and C. Brown, "The Theory and Practice of Bayesian Image Labeling", IJCV, 4, pp. 185-210, 1990, with the Highest Confidence First (HCF) optimization method. The concept is intuitively appealing: at each step, decisions should be made based on the piece of information that has the highest certainty. Recently, similar formulations have appeared in morphological processing.

Figure 2:
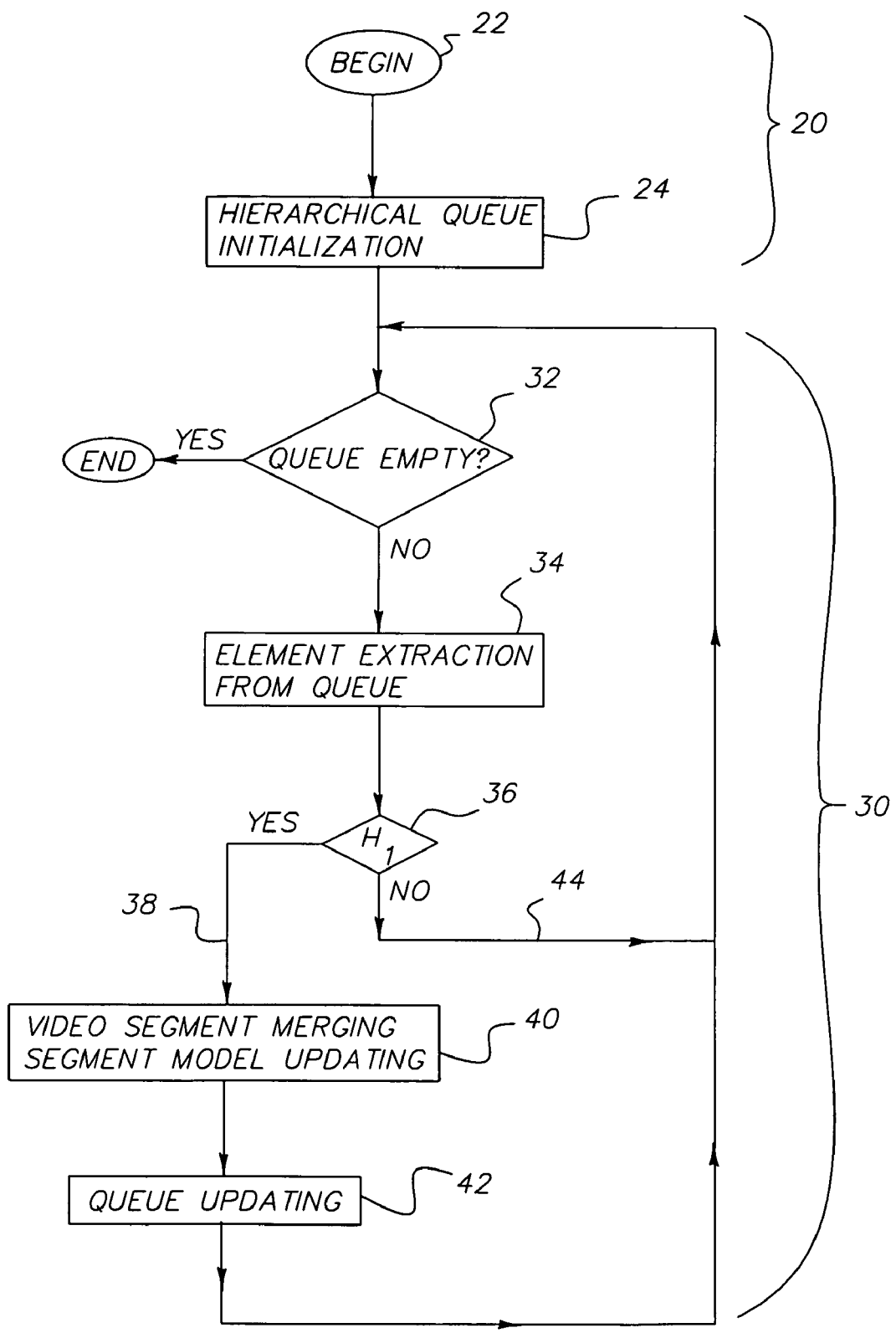
FIG. 2 is a flow graph of the video segment merging stage shown in FIG. 1.

As shown in FIG. 2, the segment merging method comprises two stages: a queue initialization stage 20 and a queue updating/depletion stage 30. The merging algorithm comprises a binary Bayes classifier, where the merging order is determined by a variation of Highest Confidence First (HCF), and the Maximum a Posteriori (MAP) criterion defines the merging criterion.

Queue initialization. At the beginning (22) of the process, inter-shot features $x_{ij}$ are computed for all pairs of adjacent shots in the video. Each feature $x_v$ is introduced (24) in the queue with priority equal to the probability of merging the corresponding pair of shots, $Pr(\varepsilon=1|x_{ij})$.

Queue depletion/updating. The definition of priority allows making decisions always on the pair of segments of highest certainty. Until the queue is empty (32), the procedure is as follows:

1. In the element extraction stage 34, extract an element (pair of segments) from the queue. This element is the one that has the highest priority.

2. Apply the MAP criterion (36) to merge the pair of segments, i.e., $$p(x_v|\varepsilon=1)Pr(\varepsilon=1) > p(x_v|\varepsilon=0)Pr(\varepsilon=0)$$

3. If the segments are merged (the path 38 indicating the application of hypothesis $H_1$), update the model of the merged segment in segment model updating stage 40, then update the queue in the queue updating stage 42 based on the new model, and go to step 1. Otherwise, if the segments are not merged (the path 44 indicating the application of hypothesis $H_0$), go to step 1.

When a pair of segments is merged, the model of the new segment $s_i$ is updated by $$m_i=(\text{card}(s_i)m_i+\text{card}(s_j)m_j)/(\text{card}(s_i)+\text{card}(s_j))$$

$$b_i=\min(b_i,b_j)$$

$$e_i=\max(e_i,e_j)$$

$$\text{card}(s_i i)=\text{card}(s_i)+\text{card}(s_j)$$

After having updated the model of the (new) merged segment, four functions need to be implemented to update the queue:

1. Extraction from the queue of all those elements that involved the originally individual (now merged) segments.
2. Computation of new inter-segment features $x=(\alpha, \beta, \tau)$ using the updated model.
3. Computation of new priorities $\Pr(\epsilon=1|x_{ij})$.
4. Insertion in the queue of elements according to new priorities.

Note that, unlike many previous methods (such as described in the Rui and Huang article), this formulation does not need any empirical parameter determination.

The merging sequence, i.e., a list with the successive merging of pairs of video segments, is stored and used to generate a hierarchy. Furthermore, for visualization and manipulation, after emptying the hierarchical queue in the merging algorithm, further merging of video segments is allowed to build a complete merging sequence that converges into a single segment (the whole video clip). The merging sequence is then represented by a partition tree 18 (FIG. 1), which is known to be an efficient structure for hierarchical representation of visual content, and provides the starting point for user interaction.

6. Video Hierarchy Visualization

An example of a tree representation stage 50 appears in FIG. 5. A prototype of an interface to display the tree representation of the analyzed home video may be based on key frames, that is, a frame extracted from each segment. A set of functionalities that allow for manipulation (correction, augmentation, reorganization) of the automatically generated video clusters, along with cluster playback, and other VCR capabilities may be applied to the representation. The user may parse the video using this tree representation, retrieve preview clips and do video editing.

Queue-based methods with real-valued priorities can be very efficiently implemented using binary search trees, where the operations of insertion, deletion and minimum/maximum location are straightforward. In the preferred embodiment of the invention, the implementation is related to the description in L. Garrido, P. Salembier and L. Garcia, "Extensive Operators in Partition Lattices for Image Sequence Analysis", Signal Processing, (66), 2, 1998, pp. 157-180.

The merging sequence, i.e. a list with the successive merging of pairs of video segments, is stored and used to generate a hierarchy. The first level 52 in the hierarchy is defined by key frames from the individual segments provided by the video segmentation stage 10. The second level stage 54 in the hierarchy is defined by key frames from the clusters generated by the algorithm used in the segment merging stage 14.

For visualization and manipulation, after emptying the hierarchical queue in the merging algorithm, further merging of video segments is allowed to build a complete merging sequence that converges into a single segment (i.e., the key frame stage 56 represents the whole video clip). The whole video clip therefore constitutes the third level of the hierarchy. The merging sequence is then represented by a Binary Partition Tree (BPT), which is known to be an efficient structure for hierarchical representation of visual content. In a BPT, each node (with exception of the leaves, which correspond to the initial shots) has two children. (P. Salembier, L. Garrido, "Binary Partition Tree as an Efficient Representation for Filtering, Segmentation, and Information Retrieval", IEEE Intl. Conference on Image Processing, ICIP '98, Chicago, Ill., Oct. 4-7, 1998.) The BPT also provides the starting point to build a tool for user interaction.

The tree representation provides an easy-to-use interface for visualization and manipulation (verification, correction, augmentation, reorganization) of the automatically generated video clusters. Given the generality of home video content and the variety of user preferences, manual feedback mechanisms may improve the generation of video clusters, and additionally give users the possibility of actually doing something with their videos.

In a simple interface for displaying the tree representation 50 of the merging process, an implementing program would read a merging sequence, and build the binary tree, representing each node of the sequence by a frame extracted from each segment. A random frame represents each leaf (shot) of the tree. Each parent node is represented by the child random-frame with smaller shot number. (Note that the term "random" may be preferred instead of "keyframe" because no effort was done in selecting it). Note also that the representation shown in FIG. 5 is useful to visualize the merging process, identify erroneous clusters, or for general display when the number of shots is small, but it can become very deep to display when the original number of shots is large.

A second version of the interface could display only the three levels of the hierarchy, i.e., the leaves of the tree, the clusters that were obtained as the result of the probabilistic merging algorithm, and the complete-video node. This mode of operation should allow for interactive reorganization of the merging sequence, so that the user can freely exchange video segments among clusters, combine clusters from multiple video clips, etc. Integration of either interface with other desired features, like playback of preview sequences when clicking on the tree nodes, and VCR capabilities, should be clear to those skilled in this art.

The invention has been described with reference to a preferred embodiment. However, it will be appreciated that variations and modifications can be effected by a person of ordinary skill in the art without departing from the scope of the invention. Although the preferred embodiment of the invention has been described for use with consumer home videos, it should be understood that the invention can be easily adapted for other applications, including without limitation the summarization and storyboarding of digital movies generally, the organization of video materials from news and product-related interviews, health imaging applications where motion is involved, and the like.

PARTS LIST

8 video frames
10 video segmentation stage
12 video shot feature extraction stage
14 video segment merging stage
16 video segment tree construction 18 binary partition tree
20 queue initialization stage
22 beginning of process
30 queue depletion/updating stage
32 queue empty decision
34 element extraction stage
36 MAP criterion application
38 path for hypothesis $H_1$
40 segment model updating stage
42 queue updating stage
44 path for hypothesis $H_2$
50 tree representation
52 first level
54 second level
56 whole video clip

What is claimed is:

1. A method for structuring video by probabilistic merging of video segments, said method comprising the steps of:
 a) obtaining a plurality of frames of unstructured video;
 b) generating video segments from the unstructured video by detecting shot boundaries based on color dissimilarity between consecutive frames;
 c) extracting a feature set by processing pairs of said segments, said extracting generating an inter-segment color dissimilarity feature and an inter-segment temporal relationship feature of each said pair of segments, said inter-segment temporal relationship feature including metrics of temporal separation between the segments of the respective said pair and accumulated duration of the segments of the respective said pair; and
 d) merging video segments with a merging criterion that applies a probabilistic analysis to the features of the feature set, thereby generating a merging sequence representing the video structure.

2. The method as claimed in claim 1 wherein the processing of pairs of segments for visual dissimilarity in step c) comprises the steps of computing a mean color histogram for each segment and computing a visual dissimilarity feature metric from the difference between mean color histograms for pairs of segments.

3. The method as claimed in claim 1 wherein representing the merging sequence is represented in a hierarchical tree structure.

4. The method as claimed in claim 1 wherein step b) comprises the steps of:
 generating color histograms from the consecutive frames;
 generating a difference signal from the color histograms that represents the color dissimilarity between consecutive frames; and
 thresholding the difference signal based on a mean dissimilarity determined over a plurality of frames, thereby producing a signal that indicates an existence of a shot boundary.

5. The method as claimed in claim 4 wherein the difference signal is based on a mean dissimilarity determined over a plurality of frames centered on one of the consecutive frames.

6. The method as claimed in claim 4 further including the step of morphologically transforming the threshold difference signal with a pair of structuring elements that eliminate the presence of multiple adjacent shot boundaries.

7. The method as claimed in claim 1 wherein said extracting of said inter-segment temporal relationship feature of each said pair of segments including determining a number of frames separating the respective said pair of segments and determining an accumulated number of frames in said segments of the respective said pair of segments.

8. The method as claimed in claim 1 wherein step d) comprises the steps of:
 generating parametric mixture models to represent class-conditional densities of inter-segment features of the feature set, said parametric mixture models being statistical models; and
 applying the merging criterion to the parametric mixture models.

9. The method as claimed in claim 8 wherein step d) is performed in a hierarchical queue and comprises the steps of:
 initializing the queue by introducing each feature into the queue with a priority equal to the probability of merging each corresponding pair of segments;
 depleting the queue by merging the segments if the merging criterion is met; and
 updating the model of the merged segment and then updating the queue based upon the updated model.

10. A method for structuring video by probabilistic merging of video segments, said method comprising the steps of:
 a) obtaining a plurality of frames of unstructured video;
 b) generating video segments from the unstructured video by detecting shot boundaries based on color dissimilarity between consecutive frames;
 c) extracting a feature set by processing pairs of said segments, said extracting generating an inter-segment color dissimilarity feature and an inter-segment temporal feature of each said pair of segments, said inter-segment temporal feature including metrics of temporal seperation between the segments of the respective said pair and accumulated duration of the segments of the respective said pair; and
 d) merging video segments with a merging criterion that applies a probabilistic analysis to the features of the feature set, thereby generating a merging sequence representing the video structure;
 wherein step d) comprises the steps of:
  generating parametric mixture models to represent class-conditional densities of inter-segment features of the feature set, said parametric mixture models being statistical models; and
  applying the merging criterion to the parametric mixture models.

11. The method as claimed in claim 10 wherein the processing of pairs of segments for their temporal relationship in step c) comprises the processing of pairs of segments for a temporal separation between pairs of segments and for an accumulated temporal duration of pairs of segments.

12. The method as claimed in claim 10 wherein step d) is performed in a hierarchical queue and comprises the steps of:
 initializing the queue by introducing each feature into the queue with a priority equal to the probability of merging each corresponding pair of segments;
 depleting the queue by merging the segments if the merging criterion is met; and
 updating the model of the merged segment and then updating the queue based upon the updated model.

13. A computer storage medium having instructions stored therein for causing a computer to perform the acts of:
 generating video segments from unstructured video by detecting shot boundaries based on color dissimilarity between consecutive frames;
 extracting a feature set by processing pairs of segments, said extracting generating an inter-segment color dissimilarity feature and an inter-segment temporal feature of each said pair of segments, said inter-segment temporal feature including metrics of temporal separation between the segments of the respective said pair and accumulated duration of the segments of the respective said pair; and merging video segments with a merging criterion that applies a probabilistic analysis to the features of the feature set, thereby generating a merging sequence representing the video structure;

wherein said merging further comprises the steps of:
generating statistical models of the feature set; and
applying the merging criterion to the statistical models.

14. A method for structuring video by probabilistic merging of video segments, said method comprising the steps of:

a) obtaining a plurality of frames of unstructured video;
b) generating video segments from the unstructured video by detecting shot boundaries based on color dissimilarity between consecutive video frames;
c) extracting a feature set by processing pairs of segments, said extracting generating an inter-segment color dissimilarity feature and an inter-segment temporal feature of each said pair of segments, said inter-segment temporal feature including metrics of temporal separation between the segments of the respective said pair and accumulated duration of the segments of the respective said pair;
d) generating a parametric mixture model of the inter-segment features comprising the feature set, said parametric mixture model being a statistical model; and
e) merging video segments with a merging criterion that applies a probabilistic Bayesian analysis to the parametric mixture model, thereby generating a merging sequence representing the video structure.

15. The method as claimed in claim 14 wherein the processing of pairs of segments for visual dissimilarity in step c) comprises the steps of computing a mean color histogram for each segment and computing a visual dissimilarity feature metric from the difference between mean color histograms for pairs of segments.

16. The method as claimed in claim 14 wherein the processing of pairs of segments for their temporal relationship in step c) comprises the processing of pairs of segments for a temporal separation between pairs of segments and for an accumulated temporal duration of pairs of segments.

17. The method as claimed in claim 14 wherein the parametric mixture model generated in step d) represents class-conditional densities of the inter-segment features comprising the feature set.

18. The method as claimed in claim 14 wherein step e) is performed in a hierarchical queue and comprises the steps of:
initializing the queue by introducing each feature into the queue with a priority equal to the probability of merging each corresponding pair of segments;
depleting the queue by merging the segments if the merging criterion is met; and
updating the model of the merged segment and then updating the queue based upon the updated model.

19. The method as claimed in claim 14 wherein the merging sequence is represented in a hierarchical tree structure that includes a frame extracted from each segment and displayed at each node of the tree.

20. A computer storage medium having instructions stored therein for causing a computer to perform acts for structuring video by probabilistic merging of video segments, the acts including:

obtaining a plurality of frames of unstructured video;
generating video segments from the unstructured video by detecting shot boundaries based on color dissimilarity between consecutive video frames;
extracting a feature set by processing pairs of segments, said extracting generating an inter-segment color dissimilarity feature and an inter-segment temporal feature of each said pair of segments, said inter-segment temporal feature including metrics of temporal separation between the segments of the respective said pair and accumulated duration of the segments of the respective said pair;
generating a parametric mixture model of the inter-segment features comprising the feature set, said parametric mixture model being a statistical model; and
merging video segments with a merging criterion that applies a probabilistic Bayesian analysis to the parametric mixture model, thereby generating a merging sequence representing the video structure.

21. A method for structuring video by probabilistic merging of video segments, said method comprising the steps of:

a) obtaining a plurality of frames of unstructured video;
b) generating video segments from the unstructured video by detecting shot boundaries based on color dissimilarity between consecutive video frames;
c) extracting a feature set by processing pairs of segments, said extracting generating an inter-segment color dissimilarity feature and an inter-segment temporal feature of each said pair of segments, said inter-segment temporal feature including metrics of temporal separation between the segments of the respective said pair and accumulated duration of the segments of the respective said pair;
d) merging adjacent video segments with a merging criterion that applies a probabilistic Bayesian analysis to parametric mixture models derived from the feature set, said parametric mixture models being statistical models, thereby generating a merging sequence; and
e) representing the merging sequence in a hierarchical tree structure.

22. The method as claimed in claim 21 wherein representing the merging sequence in a hierarchical tree structure includes displaying a frame extracted from each segment.

23. A computer storage medium having instructions stored therein for causing a computer to perform probabilistic merging of video segments, said instructions performing the acts of:

a) obtaining a plurality of frames of unstructured video;
b) generating video segments from the unstructured video by detecting shot boundaries based on color dissimilarity between consecutive video frames;
c) extracting a feature set by processing pairs of segments, said extracting generating an inter-segment color dissimilarity feature and an inter-segment temporal feature of each said pair of segments, said inter-segment temporal feature including metrics of temporal separation between the segments of the respective said pair and accumulated duration of the segments of the respective said pair;
d) merging adjacent video segments with a merging criterion that applies a probabilistic Bayesian analysis to parametric mixture models derived from the feature set, said parametric mixture models being a statistical models, thereby generating a merging sequence; and
e) representing the merging sequence in a hierarchical tree structure.

24. A method for structuring video by probabilistic merging of video segments, said method comprising the steps of:

generating video segments from a plurality of frames of unstructured video by detecting shot boundaries based on color dissimilarity between consecutive frames;

computing an inter-segment color dissimilarity feature and an inter-segment temporal relationship feature of each said pair of segments, said inter-segment temporal relationship feature including metrics of temporal separation between the segments of the respective said pair and accumulated duration of the segments of the respective said pair; and d) merging video segments with a merging criterion that applies a probabilistic analysis to said features, thereby generating a merging sequence representing the video structure.

25. The method of claim 24 wherein said computing of said inter-segment temporal relationship feature of each said pair of segments further comprises determining a number of frames separating the respective said pair of segments and determining an accumulated number of frames in said segments of the respective said pair of segments.

* * * * *